United States Patent
Nieminen

(10) Patent No.: US 10,612,231 B2
(45) Date of Patent: Apr. 7, 2020

(54) ROOF STRUCTURE AND ROOF ELEMENT

(71) Applicant: FINNFOAM OY, Salo (FI)

(72) Inventor: Henri Nieminen, Salo (FI)

(73) Assignee: FINNFOAM OY, Salo (FI)

(*) Notice: Subject to any disclaimer, the term of this patent is extended or adjusted under 35 U.S.C. 154(b) by 51 days.

(21) Appl. No.: 15/848,117

(22) Filed: Dec. 20, 2017

(65) Prior Publication Data

US 2018/0179750 A1 Jun. 28, 2018

(30) Foreign Application Priority Data

Dec. 27, 2016 (FI) .................................. 20164246 U

(51) Int. Cl.
| | |
|---|---|
| *E04B 1/30* | (2006.01) |
| *E04D 3/35* | (2006.01) |
| *E04B 7/22* | (2006.01) |
| *B32B 3/06* | (2006.01) |
| *B32B 27/06* | (2006.01) |

(Continued)

(52) U.S. Cl.
CPC .................. *E04B 1/30* (2013.01); *B32B 3/06* (2013.01); *B32B 27/06* (2013.01); *E04B 1/40* (2013.01); *E04B 7/22* (2013.01); *E04C 3/29* (2013.01); *E04C 3/291* (2013.01); *E04D 3/352* (2013.01); *E04D 3/355* (2013.01); *B32B 2419/06* (2013.01)

(58) Field of Classification Search
CPC ....... B32B 2419/06; B32B 3/06; B32B 27/06; E04B 1/40; E04B 7/22; E04C 3/29; E04C 3/291; E04D 3/352; E04D 3/355

USPC ............ 52/309.4, 309.11, 309.15, 408, 409, 52/309.7, 309.8, 309.9, 309.1, 309.16, 52/578, 588.1, 519, 525, 526

See application file for complete search history.

(56) References Cited

U.S. PATENT DOCUMENTS

| | | | |
|---|---|---|---|
| 3,209,502 A | * | 10/1965 | Donegan ................... E04D 3/38 52/394 |
| 3,397,496 A | | 8/1968 | Sohns |

(Continued)

FOREIGN PATENT DOCUMENTS

| | | |
|---|---|---|
| CH | 614483 A5 | 11/1979 |
| FR | 2813624 A1 | 3/2002 |

(Continued)

OTHER PUBLICATIONS

European Search report dated Apr. 11, 2018, EP 17209293.4, The Hague.

*Primary Examiner* — Brian E Glessner
*Assistant Examiner* — Adam G Barlow
(74) *Attorney, Agent, or Firm* — Berggren LLP

(57) ABSTRACT

Roof structure, which comprises load bearing roof beams, the longitudinal direction of which roof beams defines the width direction of the roof, roof boards and a first fastening profile and a second fastening profile, which lock to each other in the joint between two roof boards arranged against each other, whereby the first roof board comprises a first fastening profile and the second roof board comprises a second fastening profile, and which fastening profiles are substantially perpendicular to the load bearing roof beams, and which fastening profiles are continuous along the distance between at least two adjacent load bearing roof beams. Furthermore, the invention comprises a roof element suitable to be used in a roof structure.

15 Claims, 2 Drawing Sheets

(51) Int. Cl.
*E04B 1/41* (2006.01)
*E04C 3/29* (2006.01)

(56) References Cited

U.S. PATENT DOCUMENTS

| | | | | |
|---|---|---|---|---|
| 4,670,071 A * | 6/1987 | Cooper | ............... | E04D 5/12 |
| | | | | 156/247 |
| 4,677,800 A * | 7/1987 | Roodvoets | ............ | E04D 13/172 |
| | | | | 52/199 |
| 6,256,960 B1 * | 7/2001 | Babcock | ............... | E04B 1/14 |
| | | | | 52/281 |
| 7,107,731 B2 * | 9/2006 | Record | ............... | E04C 2/288 |
| | | | | 52/284 |
| 8,479,467 B2 * | 7/2013 | Johnson | ............... | B29C 44/22 |
| | | | | 52/309.1 |
| 2003/0082365 A1 * | 5/2003 | Geary | ............... | B29C 44/326 |
| | | | | 428/318.4 |
| 2004/0200154 A1 * | 10/2004 | Hunter, Jr. | ............... | E04C 2/246 |
| | | | | 52/90.1 |
| 2005/0229504 A1 * | 10/2005 | Bennett | ............... | B32B 21/06 |
| | | | | 52/105 |
| 2006/0096205 A1 * | 5/2006 | Griffin | ............... | E04C 2/296 |
| | | | | 52/309.4 |
| 2006/0096213 A1 * | 5/2006 | Griffin | ............... | E04C 2/296 |
| | | | | 52/409 |
| 2006/0276093 A1 * | 12/2006 | Agrawal | ............... | B32B 5/18 |
| | | | | 442/374 |
| 2011/0252723 A1 * | 10/2011 | Devery | ............... | E04D 3/352 |
| | | | | 52/173.3 |
| 2013/0055669 A1 * | 3/2013 | Olszewski | ............... | B32B 3/06 |
| | | | | 52/283 |

FOREIGN PATENT DOCUMENTS

| | | |
|---|---|---|
| GB | 425607 A | 3/1935 |
| IT | AR20090044 A1 | 6/2011 |
| WO | 2017004465 A1 | 1/2017 |

* cited by examiner

ROOF STRUCTURE AND ROOF ELEMENT

PRIORITY

This application claims priority of Finnish Utility Model application number U20164246 filed on Dec. 27, 2016, the contents of which are incorporated herein by reference.

FIELD OF THE INVENTION

The invention relates to a roof structure and to a roof element to be used in a roof structure according to the appended independent claim.

BACKGROUND OF THE INVENTION

The roof structures of the buildings typically comprise load bearing roof beams as well as a separate thermal insulation material layer and air and vapour barrier layers. The load bearing roof beams can be for example timber, concrete or steel. The existing structures are often labour-consuming with many working phases.

In case of fire, the inner load bearing structure of the roof structures is typically immediately exposed to a high temperature and thus its strength begins to weaken quickly.

Furthermore, the moisture condensing in the roof structures or the rain water possibly entering the structures can cause problems, for example waterlogging of the thermal insulation material and thus damage of the structures.

SUMMARY OF THE INVENTION

An object of the present invention is to reduce or even eliminate the above-mentioned problems possibly appearing in the roof structure.

An object of the present invention is to provide a roof structure which is quick and easy to build and install by using standard-sized roof boards and a ready-made fastening mechanism in the roof boards. The object of the invention is also to provide a roof element formed of roof boards, which roof element enables an easy implementation of the roof structure.

An object of the invention is further to provide a roof structure, the load bearing structures of which maintain their strength longer in case of fire.

To achieve these objects, the roof structure and a roof element according to the invention are primarily characterised in what is presented in the enclosed independent claims.

A typical roof structure according to the invention comprises
- load bearing roof beams, the longitudinal direction of which rails defines the width direction of the roof,
- roof boards, which boards comprise a planar outer surface, a planar inner surface and a core layer manufactured from thermal insulation material between the surface layers, the compression strength of which core layer is at least 10 kPa, and
- a first fastening profile and a second fastening profile, which lock to each other in the joint between two roof boards arranged against each other, whereby the first roof board comprises a first fastening profile and the second roof board comprises a second fastening profile, and which fastening profiles are substantially perpendicular to the load bearing roof beams, and which fastening profiles are continuous along the distance between at least two adjacent load bearing roof beams.

A typical roof element according to the invention comprises
- two or more roof boards arranged tightly against each other in the width direction of the element and in the longitudinal direction of the panel, which roof boards comprise a planar outer surface, a planar inner surface and a core layer manufactured from thermal insulation material between the surface layers, the compression strength of which core layer is at least 10 kPa, and
- a first fastening profile and a second fastening profile in the joint between the roof boards arranged against each other, which fastening profiles are fastened to the edge sides of the roof boards so that the first fastening profile and the second fastening profile are locked against each other, and which fastening profiles are continuous in the longitudinal direction of the element.

Other, dependent claims present some preferred embodiments of the invention. The advantages of the invention relate to a roof structure as well as to a roof element, although this it not always specifically mentioned.

The roof structure according to the invention enables the construction of the roof structure of the building to the roof beam structure from standard-sized roof boards and fastening profiles, which enable an easy fastening of the roof boards. This way, it is possible to easily and quickly construct a roof structure of the building to the roof beam structure from standard-sized roof boards. In an embodiment according to the invention, the roof structure is formed of separate roof boards and fastening profiles so that the fastening profiles are continuous along the distance between at least two adjacent roof beams and the fastening profiles are fastened to the roof beams. Thus, the structure according to the invention can be made strong with the aid of load bearing and structure reinforcing fastening profiles located in the joints between the roof boards. Further, the roof boards to be used in a roof structure according to the invention are so-called sandwich structure elements, which are sufficiently rigid to endure for example a snow load directed to the roof structure.

In a roof structure according to the invention, the load bearing fastening profiles, such as steel profiles, are inside the thermal insulation material, whereby the fastening profiles are not directly exposed to heat in case of fire, and thus the roof structure according to the invention endures longer in case of fire. For example, hollow slabs can be replaced with a structure according to the invention in structures, where fire protection is required.

In a typical roof structure according to the invention, the longitudinal direction of the load bearing roof beams defines the width direction of the roof structure. The roof structure according to the invention formed of roof boards and fastening profiles can be used with roof beam structures having all kinds of lengths. The length of the load bearing beam rails may be for example about 5-50 m depending on the building. In the longitudinal direction of the roof structure, the roof structure comprises load bearing roof beams adjacent to each other having certain distance between them. Load bearing roof beams are arranged to the structure so that the fastening profiles in the joints between the roof boards are continuous in the longitudinal direction of the roof structure along the distance of at least two adjacent load-bearing roof beams. The extension point of the fastening profile is in the longitudinal direction of the roof structure always at the point of the roof beam in order to ensure the sufficient strength of the structure. The longitudinal direction of the roof boards and the fastening profiles is substantially perpendicular to the longitudinal direction of the load bearing roof beams. In the longitudinal direction of the roof beams, i.e. in the width direction of the roof structure, the structure may comprise several roof boards next to each other and fastening profiles in the joints between them. The distance between the load bearing roof beams depends on the roof structure. Load bearing roof beams may be arranged to the structure, for example, in the intervals of 600, 900 or 1200 mm in the longitudinal direction of the roof structure, measured in the middle to the middle of two adjacent roof beams. In some embodiments, load bearing roof beams can be arranged to the structure in the intervals of 1500-3000 mm or even 4000-12000 mm in the longitudinal direction of the roof structure depending on the building. In a structure according to the invention, the length of the fastening profiles is dimensioned to be suitable with the distance between the roof beams.

The thermal insulation material forming the core layer of the roof boards to be used in a roof structure according to the invention can be any insulation material suitable for the purpose and having sufficient strength properties. The compression strength of the thermal insulation material to be used should be at least 10 kPa (according to the standard EN 826), so that the roof board has sufficient rigidity and strength properties. Most typically, the compression strength is at least 30 kPa, and even most typically, the compression strength of the thermal insulation material is in the range of 60-500 kPa. According to a preferred embodiment of the invention the core layer is made of extruded polystyrene (XPS), expanded polystyrene (EPS), polyurethane (PIR/PUR) or phenolic foam. In a preferred embodiment of the invention, extruded polystyrene is used in the roof boards, the closed cell structure of which polystyrene guarantees a waterproof structure.

The outer surface of the roof boards comprises a structure layer, which forms the planar surface of the board and substantially entirely covers the core layer on the outer surface of the board. The structure layer is typically arranged directly on the surface of the insulation material forming the core layer. In an embodiment of the invention, the structure layer of the outer surface of the roof board may be a casting compound layer, which is formed of concrete, foam concrete, mortar or corresponding casting compound, which comprises binding agent and inorganic material. In an embodiment of the invention, the concrete layer, the mortar layer or a corresponding casting compound layer may also comprise reinforcing layers, such as reinforcing fibre mat or the like. The fibre mat may be made of glass fibres, carbon fibres or other material having a good tensile strength. The casting compound layer may also comprise 1-80 weight-%, preferably 1-50 weight-% recycled XPS, EPS, polyurethane (PIR/PUR) or phenolic foam material or recycled rubber granules. The recycled material may be granules or pieces having a diameter, which is about 1-10 mm, most typically 1-5 mm. The thickness of the casting compound layer may vary depending on the properties required in the structure. In an embodiment, the thickness of the casting compound layer may be for example, 1-50 mm or 1-20 mm. The casting compound layer is typically nearly incombustible material, which on the surface of the insulation material layer protects the structures in case of fire.

In some embodiments of the invention the structure layer of the outer surface of the roof board may be, e.g., formed of sheet metal, gypsum board, reinforced plastic or other corresponding building board, which is fastened on the surface of the core layer. The structure layer of the outer surface may be formed of one or more building boards. The outer surface of the roof boards may comprise one or more structure layers depending on the desired properties and on the requirements of the site of use.

In an embodiment of the invention the structure layer of the outer surface of the roof board is formed of a non-woven fabric treated with waterproofing material. In an embodiment, the structure layer of the outer surface of the roof board comprises a non-woven fabric treated with waterproofing material and another structure layer on the surface of the insulation material. This way, it is prevented that the moisture cannot get into the structure of the roof boards. The waterproofing which is ready-made to the structure of the roof board may either act as a part of the final waterproofing of the roof structure or it already forms the final waterproofing. In an embodiment of the invention, in which the waterproofing in the structure of the roof boards forms the final waterproofing layer of the roof structure, the area of the non-woven fabric treated with a waterproofing material is typically bigger than the area of the outer surface/core layer of the roof board, whereby the non-woven fabric treated with a waterproofing material extends over the side edge of at least two outer surfaces/core layers, whereby the edges of the non-woven fabric may be installed on the adjacent roof boards and thus, the joints between the roof boards may also be coated with a waterproofing material. Typically, the two edge sides of the roof board, which comprise a non-woven fabric treated with a waterproofing material and reaching over the edge sides, are one long side edge and one short side edge of the roof board. The width of the edges of the non-woven fabric treated with a waterproofing material, which width extends over the edges of the roof board, is typically at least about 20 mm. In an exemplary embodiment, the width of the edges of the non-woven fabric extending over the edges of the roof board may be for example 100-300 mm.

The inner surface of the roof boards comprises an interior lining layer, which forms the planar surface of the board and substantially entirely covers the core layer on the inner surface of the board. The interior lining layer is typically arranged directly on the surface of the insulation material forming the core layer. The interior lining layer may be a casting compound layer, which is formed of concrete, foam concrete, mortar or other corresponding casting compound, which comprises binding agent and inorganic material. In an embodiment of the invention, the concrete layer, the mortar layer or the corresponding casting compound layer may also comprise reinforcing layers, such as a reinforcing fibre mat or the like. The fibre mat may be made of glass fibres, carbon fibres or other material having a good tensile strength. The casting compound layer may also comprise 1-80 weight-%, preferably 1-50 weight-% recycled XPS, EPS, polyurethane (PIR/PUR) or phenolic foam material or recycled rubber granules. The recycled material can be granules or pieces having a diameter, which is typically about 1-10 mm, most typically 1-5 mm. The thickness of the casting compound layer is typically about 1-20 mm. The interior lining layer made of casting compound or the like may be even or alternatively, it may comprise a structure, a groove/grooves or other desired forms.

The material of the interior lining layer of the inner surface of the roof boards depends on the desired properties, for example, soundproofing and fire resistance properties, acoustic requirements and aesthetic requirements. In an embodiment, the interior lining layer of the inner surface of the roof board comprises a timber coating, a gypsum board, a wind shield board, an acoustic board or another building board suitable for the purpose. The interior lining layer may be formed of one or more building boards. The interior lining layer may comprise one or more material layers. The material of the interior lining layer of the inner surface is typically selected so that the inner surface of the roof board is a finished inner surface, and does not therefore any longer require a separate coating of the roof structure from inside. This enhances the construction and lowers the costs.

The materials of the roof boards according to the invention comprising a core layer, an outer surface and an inner surface, vary depending on the desired properties and the purpose of use.

In a roof structure according to the invention, typically, no separate air lock or vapour lock layers are needed, since the structure of the roof boards itself enables a very high vapour resistance, and the roof boards also act as a vapour lock in the structures. This way, the manufacture of the roof structures can be simplified, and the working phases may be reduced.

The thickness and the size of the roof boards to be used in a structure according to the invention vary depending on the purpose of use. In an embodiment, the thickness of the roof boards may be for example 50-500 mm. The roof board usually has a rectangular shape, which comprises two parallel planar large surfaces (an outer surface and an inner surface), and a first and a second parallel long side edge delimiting the surfaces and a parallel first and second short side edge perpendicular to them. The length of the side edges can vary depending on the purpose of use and on the thickness of the fastening profile to be used with the roof boards. For example, the length of the side edges may vary in the range of 600-20000 mm, most typically 900-12000 mm or 1200-8000 mm. In a typical embodiment according to the invention the length of the side edges of the roof boards, which length is substantially perpendicular to the roof beams, may depend for example on the thickness of the fastening profile reinforcing the structure, and thus the above-mentioned lengths are only exemplary and do not limit the invention.

In a roof structure according to the invention the parallel side edges of the roof boards comprise a first fastening profile and a second fastening profile, which lock to each other in the joint between two roof boards arranged against each other, whereby the first roof board comprises a first fastening profile and the second roof board comprises a second fastening profile. The first fastening profile and the second fastening profile are fastened to the edge sides of the roof boards so that one edge side of the opposite edge sides comprises a first fastening profile and the second side edge comprises a second fastening profile. The fastening profiles may be ready fastened in the structure of the roof boards, so there is no need for any separate installation work at the construction site, but the roof boards can be directly installed in their places. In an embodiment of the invention the fastening profile is fastened to the board so that a part of it penetrates inside the thermal insulation material, for example the fastening profile may be U-shaped having spikes (5 ", 6 ") and penetrating inside the board. The fastening profile additionally has a shape that enables locking with another fastening profile, the fastening profile being arranged to the side edge so that the locking form is on the edge side of the roof board. The forms enabling the locking of the first and the second fastening profile are typically equally long with the entire fastening profile.

The shape and the size of the fastening profile may vary for example depending on the fact, what kind of snow load the roof structure will be designed for. The first fastening profile and the second fastening profile are shaped so that they lock to each other. In a typical roof structure according to the invention, the fastening profiles are shaped so that the second fastening profile of the roof board arranged above in the width direction of the roof locks to the first fastening profile of the roof board underneath.

According to a preferred embodiment of the invention the first and the second fastening profile are steel profiles, preferably hot-galvanised steel profiles. The fastening profiles, such as steel profiles, may be formed of a so-called thermal beam structure, whereby no cold bridge may be formed to the structure. The thickness of the fastening profiles depends on the purpose of use and on the required properties. In a typical roof structure according to the invention, the thickness of the fastening profiles may be 0.5-5 mm, most typically about 1-2 mm.

The roof structure according to the invention enables a final result without cold bridges, since the roof boards comprising an insulation material layer can be installed as a continuous layer on the load bearing structure. Further, with the above-mentioned thermal beam structure of the fastening profiles, such as steel profiles, it can be secured that no cold bridges are formed to the structure.

In the finished structure, the fastening profiles remain entirely to the space between the roof boards. Thus, the water tight roofing material can be directly installed on the outer surface of the roof boards of the roof structure according to the invention. The water tight roofing material arranged on the outer surface of the roof boards may be for example a bituminous felt, a PVC cover or other corresponding water tight roofing material, which can be installed directly on the outer surface of the roof boards according to the invention. The roof structure according to the invention may be used in roof structures, in a conventional roof structure as well as in a reversed roof structure. In the reversed roof structure, the waterproofing layer is under the thermal insulation, whereas in the conventional roof structure the waterproofing is above the thermal insulation. The outer surface of the roof board according to the invention enables for example the coating of the roof structure directly with bitumen, which otherwise is not possible on the surface of the insulation material, but now the casting compound layer protects the insulation material and it is not damaged as a result of the bitumen assembly work. Thus, the structure according to the invention simplifies and accelerates the construction work of the reversed roof structure.

In an embodiment according to the invention, the core layer formed of insulation material comprises grooves on its planar surface which is against the outer surface of the roof board, this way, ventilation gaps can be formed inside the roof board. Typically, the planar surface which will be against the outer surface of the core layer formed of insulation material comprises grooves in the longitudinal and/or in the lateral direction of the surface in the area of the entire planar surface preferably in the longitudinal and in the lateral direction in the area of the entire planar surface.

The distance between the grooves (measured from the middle to the middle) from each other on the planar surface of the core layer of the roof board may vary, typically the distance between the grooves is about 50-150 mm, most typically about 100 mm. The distance between the grooves may also be different in the lateral direction and in the longitudinal direction of the board. The width of the grooves can also vary depending on the roof structure and thus on the properties required from the roof boards. Typically, the width of the grooves is about 10-20 mm. Similarly, the depth of the grooves varies depending on the purposes of use, typically the depth of the grooves is about 10-50 mm.

The roof boards are installed to the roof structure with the aid of structure reinforcing fastening profiles, such as steel profiles, which fastening profiles are fastened to the load bearing roof beams. The fastening profiles are fastened to the roof beams for example with separate fasteners, such as screws.

In the longitudinal direction of the roof structure, the roof boards are arranged tightly against each other so that the edge sides of the roof boards arranged against each other. The joint points between the fastening profiles are in the longitudinal direction of the roof structure at the points of the roof beams. This way, the fastening profiles in the joints between the roof boards may be fastened to the roof beams and the extension points of the fastening profiles are at the points of the roof beams.

In a preferred embodiment of the invention the joints between the roof boards are furthermore sealed with a sealing foam suitable for the purpose, such as a polyurethane foam.

The roof boards to be used in a roof structure according to the invention may be installed to their places on the roof. Alternatively, bigger roof element may be built from the roof boards and from the fastening profiles in them, and may only then be transferred to their places as a finished roof element. This is possible, since the fastening profiles are always continuous along the distance between at least two roof beams, whereby the fastening of the bigger roof element to the roof beams succeeds easily in the ends of the fastening profiles. The fastening profiles which arranged against each other between the roof boards lock to each other, and thus even bigger roof elements may be ready-made assembled from the roof boards. In a roof element according to the invention two or more roof boards are tightly arranged against each other in the width direction of the element and in the longitudinal direction of the element. In the roof element, the first fastening profile and the second fastening profile are in the joint between the roof boards arranged against each other, which joint is in the longitudinal direction of the element, and which fastening profiles are fastened to the edge sides of the roof boards so that the first fastening profile and the second fastening profile are locked against each other. In the roof element, the fastening profiles are continuous in the longitudinal direction of the element. The longitudinal direction of the roof element according to the invention corresponds to the longitudinal direction of the roof structure and thus substantially perpendicular to the longitudinal direction of the load bearing roof beams of the roof structure. The width direction of the roof element corresponds to the width direction of the roof structure. The roof element according to the invention is dimensioned to be suitable to the roof beam structure of the roof structure.

The structure according to the invention is suitable for a roof structure of various kinds of buildings. The roof boards may be used with all generally used roof frame materials. The roof structure according to the invention is a very cost-effective way of making a flat roof and sloped roofs.

BRIEF DESCRIPTION OF THE DRAWINGS

In the following, the invention will be described in more detail with reference to the appended drawings, in which.

DETAILED DESCRIPTION OF THE INVENTION

Same reference numbers have been used in the Figures for describing parts corresponding to each other.

Figure 1:
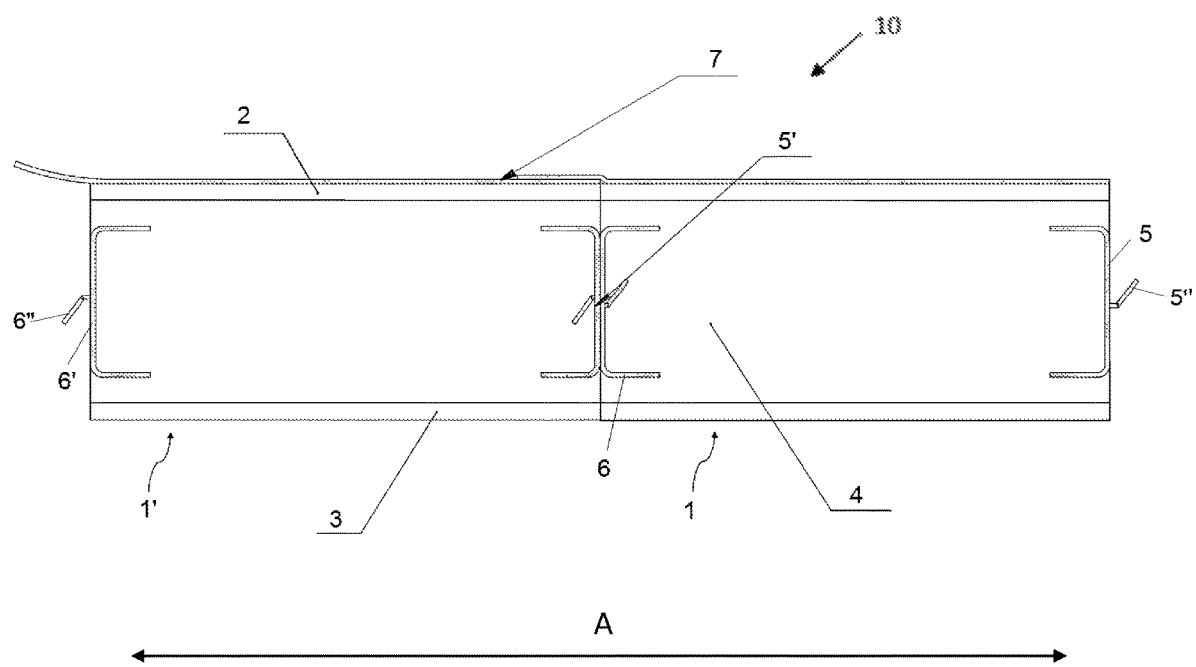
FIG. 1 shows a structure of the roof boards to be used in a roof structure according to the invention.

FIG. 1 shows two roof boards 1,1' according to an embodiment of the invention fastened to each other. The roof boards 1, 1' fastened to each other may form a roof element 10 or they may be fastened to each other only on the construction site. FIG. 1 shows a cross-section of the roof boards 1, 1' seen from the direction of the short side edge of the boards. The roof board 1, 1' comprises a planar outer surface 2, a planar inner surface 3 and a core layer 4 manufactured from a thermal insulation material between the surface layers 2, 3. The outer surface 2 of the roof board typically comprises a structure layer and the inner surface 3 comprises an interior lining layer, i.e. the roof board 1, 1' is a so-called sandwich structure element. The long side edges of the roof board 1, 1' comprise a first fastening profile 5, 5' and a second fastening profile 6, 6' so that on the opposite long edge sides of one board there is a first fastening profile 5, 5' and a second fastening profile 6, 6'. When arranging two roof boards 1, 1' against each other, the first fastening profile 5, 5' and the second fastening profile 6, 6' lock to each other in the joint between the roof boards 1, 1'. In this case, the first roof board 1 comprises a first fastening profile 5', and the second roof board 1' comprises a second fastening profile 6, which lock to each other in the joint point between the boards. The water tight roofing material 7 can be installed directly on the outer surface 2 of the roof board.

Figure 2:
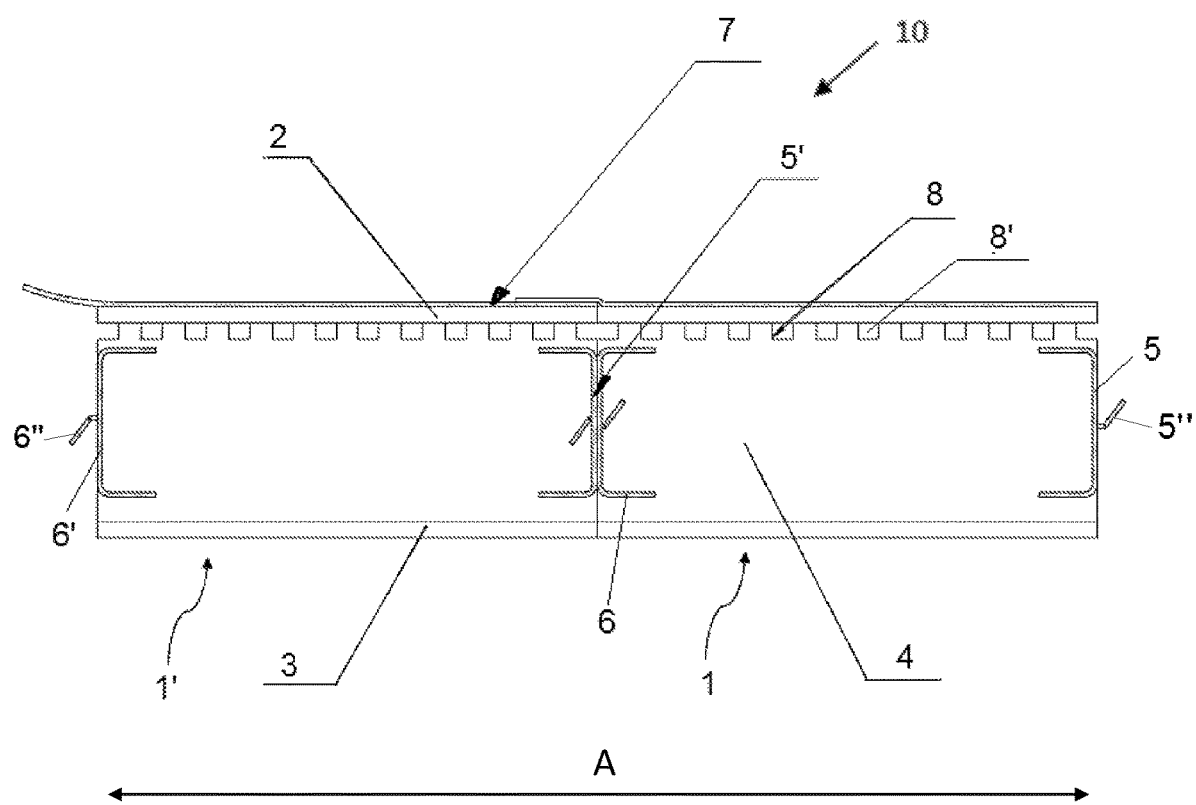
FIG. 2 shows another structure of the roof boards.

FIG. 2 shows two roof boards 1,1' according to another embodiment of the invention fastened to each other. The roof boards 1, 1' fastened to each other may form a roof element 10 or they can be fastened to each other only on the construction site. The roof boards are otherwise the same as in FIG. 1, but in this embodiment the core layer 4 manufactured from a thermal insulation material comprises grooves 8, 8' on its planar surface which is against the outer surface 2, substantially on the area of the entire planar surface. This way, it has been possible to form ventilation gaps to the structure of roof board 1, 1'.

In FIGS. 1 and 2, two roof boards 1, 1' are arranged against each other in the width direction A of the roof element 10, in the joint between which roof boards the first fastening profile 5' and the second fastening profile 6 are locked to each other. The first fastening profile and the second fastening profile are fastened to the edge sides of the roof boards. The fastening profile may be fastened to the board so that a part of it penetrates inside the thermal insulation material, for example the fastening profile may be U-shaped having spikes (5", 6") and penetrating inside the board as shown in the Figures. The fastening profile additionally has a shape that enables locking with another fastening profile, and the fastening profile being arranged to the side edge so that the locking form is on the edge side of the roof board.

The invention is not intended to be limited to the above-presented exemplary embodiments, but the intention is to apply the invention widely within the inventive idea defined by the claims defined below.

The inventionn claimed is:
1. A roof structure comprising:
a multitude of roof boards arranged adjacent to each other, each board comprising a planar outer surface, a planar inner surface, two long side edges, two short side edges, and a core layer in between the planar inner and outer surfaces,
the core layer having a compression strength of at least 10 kPa, and being made of extruded polystyrene (XPS), expanded polystyrene (EPS), polyurethane (PIR/PUR) or phenolic foam, and the planar inner surface having an interior lining layer comprising at least a casting compound layer; wherein each roof board has a first steel fastening profile fastened along one of the two long side edges, and a second steel fastening profile fastened along the other long side edge of each roof board, the first and the second steel fastening profiles being substantially U-shaped and having an open and a closed end, and the open end pointing toward the core layer and penetrating inside the core layer, and the closed end of the first steel fastening profile of one roof board being configured to lock with the closed end of the second steel fastening profile of another roof board when the roof boards are arranged adjacent to each other along their long side edges, and wherein the steel fastening profiles on the long side edges of the roof boards form continuous reinforcing structures inside the core layer when the roof boards are arranged adjacent to each other along their short side edges.

2. The roof structure according to claim 1, wherein the outer surface of the roof boards comprises a structure layer, the structure layer being selected from the group consisting of concrete, mortar, sheet metal, reinforced plastic, a gypsum board, a sheet metal board, a reinforced plastic board, and fibre fabric treated with waterproofing material.

3. The roof structure according to claim 1, wherein the casting compound layer of the inner surface of the roof boards comprises concrete, or mortar.

4. The roof structure according to claim 1, wherein the interior lining layer of the inner surface of the roof boards further comprises a timber lining, a gypsum board, a wind protection sheet, or an acoustic board.

5. The roof structure according to claim 1, wherein the first and the second steel fastening profiles are hot-galvanized steel profiles.

6. The roof structure according to claim 1, wherein the core layer of the roof boards comprises grooves underneath the outer surface, substantially on entire area of the core layer that is adjacent to the planar outer surface.

7. The roof structure according to claim 1, wherein a water tight roofing material is arranged on the outer surface of the roof boards.

8. A roof element comprising:
at least two roof boards having a planar outer surface, a planar inner surface, two short side edges, two long side edges, and a core layer manufactured from a thermal insulation material between the surface layers, the compression strength of which core layer is at least 10 kPa, and
each of the at least two roof boards having a first steel fastening profile and a second steel fastening profile fastened along the long side edges of each board, and each fastening profile being substantially U-shaped having an open end and a closed end, the open end being toward the core layer of respective roof board and penetrating inside the core layer, and the closed end of the first fastening steel profile of one board and the closed end of the second fastening steel profile of another board being configured to lock against each other, and the fastening profiles are continuous in the longitudinal direction of the element and locate inside the thermal insulation material.

9. The roof element according to claim 8, wherein the core layer of the roof boards is made of extruded polystyrene (XPS), expanded polystyrene (EPS), polyurethane (PIR/PUR) or phenolic foam.

10. The roof element according to claim 8, wherein the outer surface of the roof boards comprises a structure layer being selected from the group consisting of:
concrete, mortar, a gypsum board, sheet metal, reinforced plastic, sheet metal board, reinforced plastic board and fibre fabric treated with waterproofing material.

11. The roof element according to claim 8, wherein the inner surface of the roof boards comprises an interior lining layer, which comprises a casting compound layer.

12. The roof element according to claim 8, wherein the first and the second steel fastening profiles are hot-galvanized steel profiles.

13. The roof element according to claim 8, wherein the core layer of the roof boards comprises grooves underneath the outer planar surface, substantially in entire area of the core layer that is adjacent to the planar outer surface.

14. The roof element of claim 8, wherein the closed ends of the fastening profiles have one or more outward pointing locking spikes, wherein the locking spikes of the first profile of one board are configured to lock with the locking spikes of the second profile of another board.

15. The roof structure of claim 1, wherein, the closed ends have one or more outward pointing locking spikes, wherein the locking spikes of the first profile of one roof board are configured to lock with the locking spikes of the second profile of another roof board.

\* \* \* \* \*